United States Patent Office 3,701,667
Patented Oct. 31, 1972

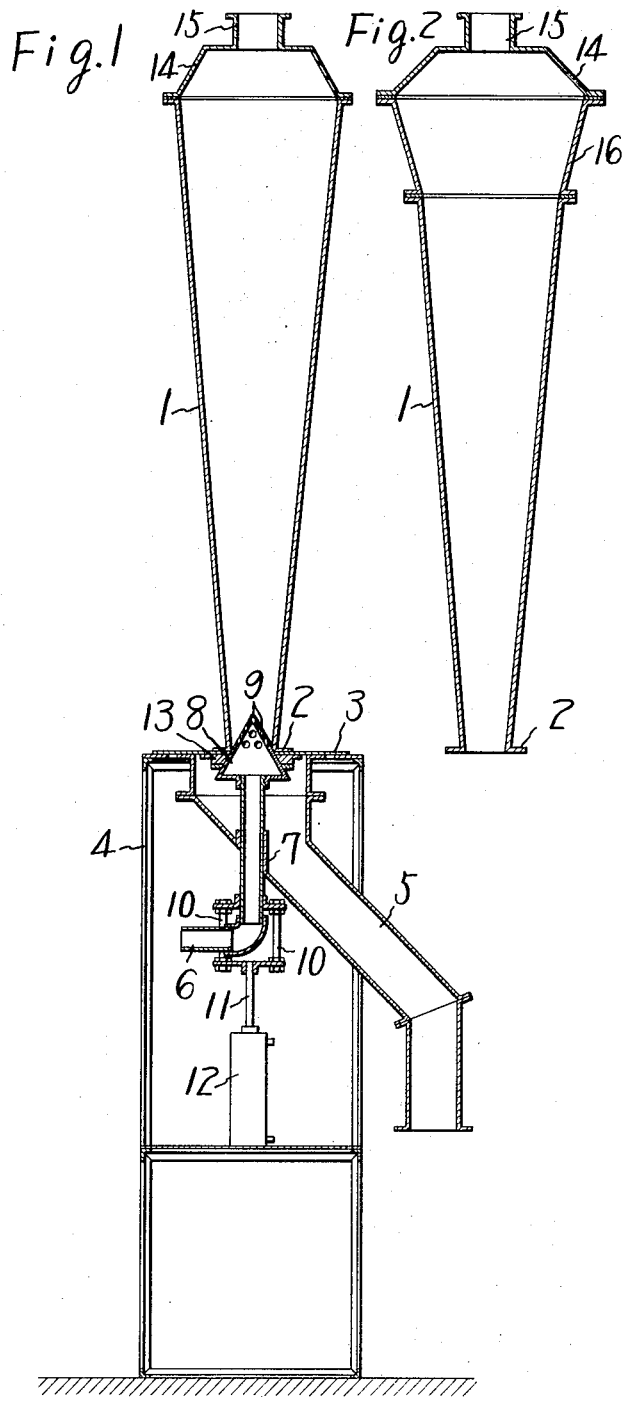

3,701,667
METHOD FOR PUFFING GELATINIZED RICE GRAINS
Takao Heki, Katsuharu Yasumatsu, and Koshichi Sawada, Osaka-fu, and Yoshiro Funakoshi, Kyoto-fu, Japan, assignors to Takeda Chemical Industries, Ltd., Osaka-shi, Japan
Filed Oct. 1, 1969, Ser. No. 862,672
Int. Cl. A23l 1/18
U.S. Cl. 99—81
6 Claims

ABSTRACT OF THE DISCLOSURE

A method for puffing gelatinized rice grains is characterized by subjecting gelatinized rice grains to a hot air stream which slows down as it moves upward in a tower to puff the rice grains. An apparatus for the method is characterized by the provision of a tower whose inner diameter increases gradually toward its upper portion, the inclination angle of its generating line with respect to the axis thereof being in the range of 2.5 to 30 degrees.

The present invention relates to a method for puffing gelatinized rice grains and an apparatus therefor. More particularly, the present invention relates to an improved method and apparatus for producing a pre-cooked rice by puffing gelatinized rice grains in a hot air stream.

While rice is a valuable foodstuff extensively used throughout the world, it has disadvantages that it requires a considerable period of time for cooking and that the cook has to be skillful to some extent. Accordingly, various attempts have so far been made to produce a pre-cooked rice which can be stirred or heated with hot water to effect rehydration and prepare cooked rice in a few minutes. However, the pre-cooked rice obtained by a conventional method is not uniform in quality and unattractive in appearance, and consequently the cooked rice prepared by subjecting the product to rehydration is poor in taste and appearance. In general, the conventional method of producing a pre-cooked rice comprises two steps, namely, gelatinization of ordinary rice and puffing of the gelatinized rice. Insofar as the rice grains have been gelatinized perfectly in the gelatinization step, the quality and appearance of the pre-cooked rice depend upon the subsequent step of puffing. Various methods heretofore proposed for puffing gelatinized rice grains include a preferred method in which gelatinized grains are puffed by being tumbled about and suspended in a hot air stream flowing upward in a duct of a uniform inner diameter. This method, however, has following disadvantages:

(1) Satisfactory puffing or gelatinized rice requires a long duct, namely an apparatus of a large capacity.

(2) Depending upon the position of the respective rice grains relative to the direction of the hot air stream when they are brought into contact with the hot air forced upward within the duct, the grains are carried upward with varying velocities which result in a variation in the residence time, so that the pre-cooked rice produced is not uniform in quality. That is, the grains obtained with too short a period of residence time are not rendered perfectly porous in the internal portions, with the interiors of the grains left uncooked despite the rehydration, whereas too long a period of residence time produces scorches on the grain surfaces and undesirably coloration in the product, thereby impairing the quality, appearance and consequently the commercial value of the product.

(3) The rice grains once puffed to an increased volume get abraded locally due to contact with the inner wall of the duct or get scorched when stuck to the inner wall.

Accordingly an object of the present invention is to provide a pre-cooked rice which has a uniform quality and opaque white appearance and from which a very white, delicious cooked rice can be prepared only in a few minutes by stirring or heating it with hot water for rehydration.

Another object of the present invention is to provide a method and apparatus free from the above-mentioned disadvantages for puffing gelatinized rice grains in a hot air stream.

Another object of the present invention is to provide a method for preparing puffed, pre-cooked rice from gelatinized rice by an apparatus of a very small capacity with high efficiency and an apparatus therefor.

Another object of the present invention is to provide a method and apparatus which are capable of retaining respective rice grains in a hot air stream for a definite period of residence time so that a pre-cooked rice uniform in quality and free from coloration due to scorches may be produced.

Still another object of the present invention is to provide a method and apparatus which are capable of producing a pre-cooked rice attractive in appearance without allowing puffed rice grains to contact or stick to the inner wall of the apparatus so as to prevent the grains from scorching.

The above and other objects of the present invention to be disclosed in the following description are accomplished by a method comprising the steps of injecting a hot air of 200 to 450° C. into a vertical tower from its bottom to produce an upward stream of the hot air which slows down as it moves upward, the tower having the inner diameter increasing gradually toward the upper portion, the inclination angle of its generating line with respect to the axis thereof being in the range of 2.5 to 30 degrees, subjecting gelatinized rice grains with a moisture content of 8 to 20 percent by weight to the upward stream to thereby puff the rice grains while the rice grains are being forced upward by the upward stream until the puffed rice grains are suspended at the upper portion of the tower to complete puffing, stopping the hot air supply, and discharging the puffed rice grains from the tower.

The present invention employs a vertical puffing tower whose inner diameter increases gradually toward the upper portion, the inclination angle of its generating line with respect to the axis thereof being in the range of 2.5 to 30 degrees. By employing such tower, an upward stream can be readily produced which slows down gradually as it moves upward. Gelatinized rice grains having a moisture content of 8 to 20 percent by weight, when subjected to the upward stream, can be puffed with high efficiency as described below in detail, with the result that a suitably puffed pre-cooked rice of uniform quality can be obtained without impairing its appearance by a smaller apparatus as compared with a conventional method of puffing rice grains with a blast of hot air. Most preferably, the puffed rice grains are puffed to the specific volume of about 4.5 to 5.5 ml./g. by the puffing procedure. If the specific volume of the puffed rice grains is smaller than the above-mentioned volume, rehydration will result in hard cooked rice, whereas grains of a larger specific volume will cook too softly when rehydrated. The specific volume as referred to herein is given by the equation:

$$\text{Specific volume} = \frac{V \text{ (ml)}}{100 \text{ (g)}}$$

where V is the volume in milliliter of 100 g. of puffed or gelatinized rice grains as they are packed tightly together in a 1-liter messcylinder.

It is required that the respective gelatinized rice grains to be used in the present invention be completely gelatinized, but insofar as the gelatinization is carried out perfectly, grains may be gelatinized in any known method. Raw rice may be gelatinized by various methods as, for instance, by boiling it in water or by subjecting it to steam. In order to reduce the time for gelatinization, raw rice may be soaked in water of about 5 to 60° C. prior to boiling or contact with steam. In case where at least one of citric acid, pyrophosphoric acid, polyphosphoric acid, metaphosphoric acid, an edible salt thereof is added to this water, rehydration of puffed rice can be effected with improved efficiency. In addition, if raw rice is soaked in aqueous emulsion of edible oil such as lard oil and/or monoglyceride as it is or after being boiled or steamed moderately and is then completely gelatinized by further boiling or steaming, still better results will be achieved in the rehydration of puffed rice. The rice thus gelatinized is dried at a relatively low temperature of about 30 to 100° C. The drying operation which may be carried out by various devices as by a rotary drier, air oven, etc. continues until the moisture content is 8 to 20% by weight, preferably 12 to 17% by weight. The moisture content of the gelatinized rice grains exerts an influence on the degree of puffing. From the grains of the above-mentioned moisture content, rice grains puffed to a specific volume of 4.5 to 5.5 ml./g. are obtained.

The present invention will hereinafter be described with reference to the accompanying drawings, in which:

FIG. 1 is a side elevation in vertical section showing a preferred embodiment of an apparatus for puffing gelatinized rice grains in accordance with the present invention; and FIG. 2 is a side elevation in vertical section showing a tower of another embodiment of the present invention.

In FIG. 1 designated at 1 is a vertical puffing tower formed in an inversed, truncated conical shape with its inner diameter increasing toward the upper end, the inclination angle of its generating line with respect to the axis thereof (hereinafter referred to as "inclination angle") being 5 degrees. Most preferably, the puffing tower may be in an inversed, truncated conical form as shown in the drawing, but so far as the inner diameter increases toward its upper portion, the tower with elliptical or polygonal section may also be employed. Although the illustrated tower has an inclination angle of 5 degrees, the angle may be in the range of 2.5 to 30 degrees, preferably in the range of 4 to 15 degrees. By means of a flange 2, the lower end of the puffing tower 1 is fixed to the upper face of a supporting plate 3 secured to a supporting frame 4. Designated at 5 is a discharger of puffed rice fixed to the under face of the support plate 3 and having a lower end connected to a container of puffed rice (not shown). Indicated at 6 is a pipe for supplying hot air which is slidably inserted into the discharger 5 at a bearing portion 7 formed therein. A hot air injection portion 8 formed in conical shape and provided with a number of small holes 9 at its upper portion is screwed into the upper end of the pipe 6. The hot air pipe 6 is fixedly mounted on a support 10 secured to the upper end of a vertically movable rod 11 of an air cylinder 12, the air pipe 6 thus being adapted for upward or downward movement. Accordingly, when the air pipe 6 is moved upward by the air cylinder 12, the upper portion of the conical air injecting portion 8 at the upper end of the pipe 6 is brought into engagement with the bottom of the puffing tower 1, airtight contact being effected by a packing 13 (the state shown in FIG. 1). On the other hand, when the pipe 6 is moved downward, the bottom of the puffing tower 1 is opened to allow the puffed rice in the tower 1 to drop into the discharger 5. Although not illustrated, the other end of the hot air pipe 6 is connected to a hot air generator by way of a valve for adjusting the flow rate of air and a flexible pipe such as a bellow-type duct. Airtightly fixed to the top end of the puffing tower 1 is a covering member 14 whose top portion is provided with an outlet 15 for waste air. Disposed above the puffing tower 1 is a feeder (not shown) for supplying a predetermined amount of gelatinized rice through the waste air outlet 15.

To close the bottom of the tower 1 airtightly, the hot air inlet pipe 6 is moved upward by the air cylinder 12. A predetermined amount of gelatinized rice is then fed into the tower 1 through its top end. Hot air of 200 to 450° C., preferably of 250 to 350° C., supplied through the pipe 6 is introduced into the tower 1 through the small holes 9 in the injecting portion 8 at the top of the pipe 6. Since the tower 1 has an inclination angle of 2.5 to 30 degrees with the inner diameter increasing toward it supper portion, the hot air supplied into the tower 1 produces an air stream which slows down as it moves upward. The gelatinized rice grains at the bottom of the tower 1, being subjected to the air stream forced upward at the highest velocity immediately after the air injection, are tumbled about and suspended therein. Due to the fact that the upward air stream slows down as it approaches the upper portion, the rice grains suspended in the air stream are not blown about beyond a certain level, insofar as their bulk density does not decrease due to puffing. Because the hot air has such a high temperature as 200 to 450° C., the rice grains, tumbled about and suspended in the upward current, puff up rapidly owing to the expansion of the moisture contained therein, resulting in decrease in bulk density. The rice grains whose bulk density has been attenuated further puff up to undergo greater decrease in bulk density as they are carried upward while being tumbled about and suspended in the upward stream. Thus repeating expansions and upward movements, the puffed rice grains finally reach the upper portion of the tower 1 of greater inner diameter and are suspended in the upward air stream which has slowed down and in which the grains are no longer blown about. Puffing operation is thus completed. When almost all of the rice grains are brought to and suspended at the upper portion of the tower 1, the air supply is stopped. Normally, puffing is carried out within such a short period as 7 to 30 seconds. Under preferable conditions, puffing may be completed in about 10 to 20 seconds. When air supply is discontinued, the puffed rice grains suspended at the upper portion of the tower 1 move downward to get settled on its bottom. The air injecting portion 8 of the air inlet pipe 6 is then disengaged from the bottom of the tower by moving the pipe 6 downward with the air cylinder 12 to discharge the puffed rice into the container (not shown) through the discharger 5. The respective grains of puffed rice obtained have a specific volume of 4.5 to 5.5 ml./g. and opaque white color. The puffed rice grains, when stirred and heated with hot water for rehydration, will be made into nearly pure white, delicious cooked rice only in a few minutes.

In accordance with the present invention not only the velocity of the hot air stream is reduced as it moves upward but the temperature thereof is also lowered as it approaches the upper portion of the tower due to heat exchange with the gelatinized rice grains. Therefore, the rice grains are progressively carried upward in accordance with the degree of puffing effected while being expanded in contact with the hot air stream whose velocity and temperature are gradually lowered. Fully puffed and reduced in density, the rice grains are finally suspended in the air stream of the lowest velocity and temperature at the upper portion of the tower without being blown away to complete puffing and the hot air supply is stopped upon the completion of puffing. Thus, uniformly puffed rice grains free of scorches can be obtained by contact with the hot air within a constant contact period of time. The upward stream which effects such puffing operation is readily produced by employing the tower having an inner diameter which increases toward upper portion and inclination angle of 2.5 to 30 degrees. The velocity of the hot air flowing upward in the tower 1, is such that at the bottom portion of the tower it is not lower than the minimum velocity, i.e., so-called terminal velocity of gelatinized rice grains, with which gelatinized rice grains can be blown about and that at the top portion it is in the range of from the minimum velocity capable of suspending the puffed grains to a velocity less than the minimum velocity for blowing away the puffed rice grains, i.e. so-called terminal velocity of puffed rice grains. Although the terminal velocity of gelatinized rice grains varies depending upon the specific volume of the gelatinized rice grains, it is not lower than 11 m./sec., while the terminal velocity of puffed rice grains which differs depending upon the specific volume of the puffed rice grains is not higher than 5 m./sec. Accordingly, the hot air stream produced in practicing the present invention has a velocity of not lower than 11 m./sec., preferably of not lower than 20 m./sec., at the bottom of the tower and a velocity of not higher than 5 m./sec. at the upper portion thereof. Such distribution of the stream velocity within the tower can readily be achieved by providing the tower with inclination angle of 2.5 to 30 degrees and by suitably selecting the injecting velocity of the hot air into the tower which is at least 11 m./sec., preferably may not be lower than 20 m./sec.

The present invention employs a puffing tower which has the inner diameter increasing toward the upper portion thereof, the inclination angle of the tower being 2.5 to 30 degrees and in which the upward hot air stream decreasing in velocity toward the upper portion is produced to complete puffing at the upper portion, so that the tower can be formed with a very small height usually of about 1 to 5 meters. In case of a conventional method where rice grains are fed into a duct of a uniform inner diameter and hot air is supplied thereto at a velocity sufficient to suspend the rice grains, the duct has to be several tens of meters in length if a satisfactory puffing operation is to be carried out. In contrast, the present invention ensures a marked reduction in the capacity of the apparatus. Furthermore, with the puffing tower whose inner diameter increases toward the upper end, the puffed rice grains, while being suspended, are less susceptible to abrasion due to contact with the inner wall of the tower and they are perfectly prevented from being stuck to the inner wall. The prevention of scorching attained is attributable to the fact that the inclination angle of the tower is not greater than 30 degrees and the puffed rice grains come into contact with hot air of lower temperature as puffing is effected to greater extent.

In practicing the present invention, various alterations are possible. As shown in FIG. 2, for instance, the puffing tower 1 may be provided, at its upper portion, with a top portion 16 having a greater inclination angle for suspending puffed rice. In this manner, a more effective puffing operation can be achieved by a tower of smaller height.

The example of the present invention will be described below.

Example 1 kg. of Japanese rice washed with water in usual manner was soaked overnight at room temperature in 1 liter of water containing 500 mg. of citric acid. The soaked rice was drained and subjected to steam heated at 100° C. for 15 minutes. The steamed rice was immediately soaked for 5 minutes in 1.3 liters of an aqueous emulsion containing 3.0 wt. percent of lard oil and 0.3 wt. percent of monoglyceride, then drained, and again heated by steaming at 100° C. for 60 minutes. The rice was then dried uniformly with a hot air current of 80° C. to the moisture content of 16 wt. percent.

The specific volume of dried rice grains thus obtained had approximately 1.2 milliliter per gram. The respective dried grains were found to be completely gelatinized up to the innermost portion.

The gelatinized rice obtained was subjected to puffing by employing an apparatus similar to one shown in FIG. 1 which was 4 m. in height, 12 cm. in inner diameter of the bottom and had the inclination angle of 5 degrees, the apparatus further being provided with inspection windows (not shown) at appropriate portions in the side wall of the tower.

400 grams of gelatinized rice obtained above was fed into the tower and hot air of 300° C. was introduced thereinto from the bottom at the rate of 900 m.³/hr. Tumbled about and suspended in the hot air stream at the lower portion of the tower, the rice grains were puffed and the puffed grains were forced upward by the hot air while being further puffed until they got suspended at the tower upper portion. The velocity of the hot air stream at the top portion was 4 m./sec. During this operation the puffed rice grains were not expelled from the top of the tower by the hot blast. In 15 seconds all of the rice grains were suspended at the upper portion, when the supply of hot air was halted, whereupon the puffed rice grains dropped to the bottom of the tower, from which the rice was then discharged.

The rice grains thus obtained had a multiplicity of small pores in the interior thereof, the specific volume thereof being 4.6 milliliters per gram. They had an opaque white appearance and none of the grains were found to be colored due to scorching or to be abraded locally The whiteness of the puffed rice measured by photoelectric reflectometer was 53.5%. The moisture content measured when the puffed rice was dried to a constant volume at 105° C. was 3.8%.

10 ml. of salad oil and 200 ml. of hot water was added to 90 g. of puffed rice thus produced. The rice was then heated for 4 minutes with a frying-pan and a pure white cooked rice was prepared.

The taste of the cooked rice was tested by ten specialists by the sensory test. The taste was judged in accordance with the softness of the cooked rice. The degree of softness was divided into 13 criteria, the softest being +6 and the hardest being −6. "+6" stands for excessive softness and "−6", excessive hardness, these therefore showing poor taste, while by "0±1" are meant moderate softness and good taste.

The results of this test show that the cooked rice prepared from the pre-cooked rice of the present invention had a softness of +0.62 on average, the cooked rice thus being provided to be of moderate softness and excellent taste.

What we claim is:

1. A method of puffing gelatinized rice grains comprising steps of:

(A) injecting a hot air of 200 to 450° C. into a vertical tower from its bottom to produce an upward stream of the hot air which slows down as it moves upward and which has a velocity of not lower than 11 m./sec. at the bottom of the tower and a velocity of not higher than 5 m./sec. at the upper portion of the tower, said tower having the inner diameter increasing gradually toward its upper portion;

(B) subjecting gelatinized rice grains with a moisture content of 8 to 20 percent by weight to said upward stream to thereby puff the rice grains while the rice grains are being forced upward by said upward stream until the puffed rice grains are suspended at the upper portion of said tower to complete puffing without blowing the puffed rice grains from the top of the tower;

(C) stopping the hot air supply whereby the puffed rice grains suspended at the upper portion of the tower move downward in said tower; and (D) discharging the puffed rice grains from said tower.

2. The method for puffing gelatinized rice grains as claimed in claim 1 wherein the velocity at the bottom of the tower is not lower than 20 m./sec.

3. The method for puffing gelatinized rice grains as claimed in claim 1 wherein the temperature of the hot air to be injected into said tower is 250 to 350° C.

4. The method for puffing gelatinized rice grains as claimed in claim 1 wherein the moisture content of the gelatinized rice grains is 12 to 17 percent by weight.

5. The method for puffing gelatinized rice grains as claimed in claim 1 wherein the period of time for the gelatinized rice grains to be in contact with said hot air stream is 7 to 30 seconds.

6. The method for puffing gelatinized rice grains as claimed in claim 5 wherein said contact time is 10 to 20 seconds.

References Cited

UNITED STATES PATENTS

| | | | |
|---|---|---|---|
| 2,616,808 | 11/1952 | Roberts | 99—81 |
| 2,602,134 | 7/1952 | Nelson | 99—81 X |

RAYMOND N. JONES, Primary Examiner

U.S. Cl. X.R.

99—238

UNITED STATES PATENT OFFICE
CERTIFICATE OF CORRECTION

Patent No. 3,701,667      Dated October 31, 1972

Inventor(s) Takao Heki, Katsuharu Yasumatsu, Koshichi Sawada and Yoshiro Funakoshi It is certified that error appears in the above-identified patent and that said Letters Patent are hereby corrected as shown below:

In the heading insert --

Claims priority of Japanese Application Serial No. 72377/68, filed October 3, 1968.

Signed and sealed this 29th day of May 1973.

(SEAL)
Attest:

EDWARD M. FLETCHER, JR.
Attesting Officer

ROBERT GOTTSCHALK
Commissioner of Patents